United States Patent
Kwon et al.

(10) Patent No.: US 11,313,011 B2
(45) Date of Patent: Apr. 26, 2022

(54) METHOD FOR REFINING MAGNETIC DOMAINS OF GRAIN-ORIENTED ELECTRICAL STEEL SHEET

(71) Applicant: POSCO, Gyeongsangbuk-do (KR)

(72) Inventors: Oh-Yeoul Kwon, Pohang-si (KR);
Ki-Young Min, Pohang-si (KR);
Se-Min Park, Pohang-si (KR);
Jong-Tae Park, Pohang-si (KR);
Seong-Cheol Hong, Pohang-si (KR)

(73) Assignee: POSCO, Pohang-si (KR)

( * ) Notice: Subject to any disclaimer, the term of this patent is extended or adjusted under 35 U.S.C. 154(b) by 253 days.

(21) Appl. No.: 16/472,484

(22) PCT Filed: Dec. 20, 2017

(86) PCT No.: PCT/KR2017/015128
§ 371 (c)(1),
(2) Date: Jun. 21, 2019

(87) PCT Pub. No.: WO2018/131819
PCT Pub. Date: Jul. 19, 2018

(65) Prior Publication Data
US 2021/0130922 A1    May 6, 2021

(30) Foreign Application Priority Data
Dec. 22, 2016 (KR) .......................... 10-2016-0177082

(51) Int. Cl.
*C21D 10/00* (2006.01)
*B23K 26/0622* (2014.01)
(Continued)

(52) U.S. Cl.
CPC ........ *C21D 10/005* (2013.01); *B23K 26/0622* (2015.10); *B23K 26/073* (2013.01);
(Continued)

(58) Field of Classification Search
CPC .............. C21D 10/005; C21D 2201/05; C21D 8/1283; C21D 8/1288; C21D 3/08;
(Continued)

(56) References Cited

U.S. PATENT DOCUMENTS

| | | | |
|---|---|---|---|
| 4,963,199 A | 10/1990 | Pavlik et al. | |
| 7,763,120 B2 * | 7/2010 | Sakai | C21D 8/1294 148/112 |

(Continued)

FOREIGN PATENT DOCUMENTS

| | | |
|---|---|---|
| CN | 101415847 A | 4/2009 |
| CN | 103069036 A | 4/2013 |

(Continued)

OTHER PUBLICATIONS

International Search Report dated May 29, 2018 issued in corresponding International Patent Application No. PCT/KR2017/015128.

(Continued)

*Primary Examiner* — John A Hevey
(74) *Attorney, Agent, or Firm* — Morgan, Lewis & Bockius LLP

(57) ABSTRACT

A method for refining magnetic domains of a grain-oriented electrical steel sheet according to an exemplary embodiment of the present invention includes: a step of preparing a grain-oriented electrical steel sheet; and a step of forming a groove by irradiating a quasi-continuous laser beam of which a duty is from 98.0 to 99.9% on a surface of the grain-oriented electrical steel sheet.

8 Claims, 4 Drawing Sheets

(51) Int. Cl.
   *B23K 26/364* (2014.01)
   *B23K 26/073* (2006.01)
   *C21D 3/04* (2006.01)
   *C21D 6/00* (2006.01)
   *C21D 8/12* (2006.01)
   *C21D 9/46* (2006.01)
   *B23K 103/04* (2006.01)

(52) U.S. Cl.
   CPC .............. *B23K 26/364* (2015.10); *C21D 3/04* (2013.01); *C21D 6/008* (2013.01); *C21D 8/1233* (2013.01); *C21D 8/1255* (2013.01); *C21D 8/1283* (2013.01); *C21D 8/1294* (2013.01); *C21D 9/46* (2013.01); *B23K 2103/04* (2018.08); *C21D 2201/05* (2013.01)

(58) Field of Classification Search
   CPC ........ C21D 8/1277; C21D 3/04; C21D 6/008; C21D 8/1233; C21D 8/1255; C21D 8/1294; C21D 9/46; C21D 10/00; B23K 26/364; B23K 26/0622; B23K 26/073; B23K 2103/04; C22C 38/02
   See application file for complete search history.

(56) References Cited

U.S. PATENT DOCUMENTS

| | | | | |
|---|---|---|---|---|
| 2013/0064256 A1* | 3/2013 | Xu | ............... | H01S 3/0092 372/27 |
| 2013/0139932 A1* | 6/2013 | Sakai | ............... | C21D 8/1272 148/565 |
| 2014/0246124 A1* | 9/2014 | Okubo | ............... | C22C 38/04 148/22 |
| 2014/0374137 A1* | 12/2014 | Kwon | ............... | B23K 26/354 174/126.3 |
| 2015/0059932 A1* | 3/2015 | Hirano | ............... | C22C 38/001 148/306 |
| 2015/0318091 A1* | 11/2015 | Hirano | ............... | C22C 38/001 148/112 |

FOREIGN PATENT DOCUMENTS

| | | |
|---|---|---|
| EP | 0870843 A1 | 10/1998 |
| EP | 2006397 A1 | 12/2008 |
| EP | 2602344 A1 | 6/2013 |
| JP | 2003-129135 A | 5/2003 |
| JP | 5000182 B2 | 8/2012 |
| JP | 2013-036121 A | 2/2013 |
| KR | 10-2008-0106305 A | 12/2008 |
| KR | 10-1389647 B1 | 4/2014 |
| KR | 10-1472229 B1 | 12/2014 |
| KR | 10-2015-0073549 A | 7/2015 |
| KR | 10-2016-0019919 A | 2/2016 |
| KR | 10-2016-0078242 A | 7/2016 |
| WO | 1997-024466 A1 | 7/1997 |
| WO | 2004-083465 A1 | 9/2004 |

OTHER PUBLICATIONS

Chinese Search Report dated Jun. 10, 2020 issued in Chinese Patent Application No. 201780080297.9.
Extended European Search Report dated Oct. 25, 2019 issued in European Patent Application No. 17891326.5.

* cited by examiner

METHOD FOR REFINING MAGNETIC DOMAINS OF GRAIN-ORIENTED ELECTRICAL STEEL SHEET

CROSS-REFERENCE OF RELATED APPLICATIONS

This application is the U.S. National Phase under 35 U.S.C. § 371 of International Patent Application No. PCT/KR2017/015128, filed on Dec. 20, 2017, which in turn claims the benefit of Korean Patent Application No. 10-2016-0177082, filed Dec. 22, 2016, the entire disclosures of which applications are incorporated by reference herein.

TECHNICAL FIELD

The present invention is related to a method for refining magnetic domains of a grain-oriented electrical steel sheet.

BACKGROUND ART

Since a grain-oriented electrical steel sheet is used as an iron core material of an electrical device such as a transformer, in order to improve energy conversion efficiency thereof by reducing power loss of the device, it is necessary to provide a steel sheet having excellent iron loss of the iron core material and a high occupying ratio when being stacked and spiral-wound.

The grain-oriented electrical steel sheet refers to a functional material having a texture (referred to as a "GOSS texture") of which a secondary-recrystallized grain is oriented with an azimuth {110}<001> in a rolling direction through a hot rolling process, a cold rolling process, and an annealing process.

A permanent magnetic domain refining method which shows the improvement of the iron loss even after stress relaxation heat treatment above a heat treatment temperature where recovery occurs may be divided into an etching method, a roll method, and a laser method. Since it is difficult to control a groove shape because the grooves are formed on the surface of the steel sheet by a selective electrochemical reaction in a solution, it is difficult to uniformly secure the iron loss characteristics of the final product in the width direction. In addition, an acid solution used as a solvent has a disadvantage that it is not environmentally friendly.

The method of refining the permanent magnetic domain by the roll is a technology of magnetic domain miniaturization partially generating recrystallized particles under the groove by forming and then annealing a groove having a constant width and depth on the surface of the plate by processing a protrusion shape on the roll to be pressed by the roll or the plate. The roll method is disadvantageous in stability in machine processing, reliability to obtain stable iron loss depending on the thickness, and process complexity, and deterioration of the iron loss and the magnetic flux density characteristics immediately after the groove formation (before the stress relaxation annealing).

The method of refining the permanent magnetic domains by laser uses a method in which a laser beam of high output is irradiated onto a surface portion of an electrical steel sheet moving at a high speed, and a groove accompanied by melting of a base portion is formed by laser irradiation. The lasers used here are a Q-Switch or a pulse laser, and a continuous wave laser.

As the method of refining the permanent magnetic domain by the continuous laser does not uniformly form a re-solidified layer of the groove part on the entire surface of the groove when forming the groove, because of causing excessive deformation at the bottom part of the groove, it is difficult to apply to the process before the primary recrystallization process or after the primary recrystallization process, and since re-solidified layer under the groove is thin compared to the side surface part, the thickness of the oxide layer during decarburization annealing is thin, therefore a Forsterite layer and the interface between the forsterite/the insulating coating layer is weakened after the insulating coating, which causes a disadvantage that the adhesion is weakened.

As the method of refining the permanent magnetic domain by the Q-switch or the pulse laser forms the groove by using evaporation of the irradiation part material during the irradiation and there is no relationship with the formation of the re-solidified layer, the secondary recrystallization formation by the recrystallization behavior due to a heat effect of the groove part in the first recrystallization after the continuous groove is unstable, thereby there is a drawback that the magnetic characteristic is deteriorated.

DISCLOSURE

A method for refining magnetic domains of a grain-oriented electrical steel sheet for improving magnetic and adhesion characteristics is provided.

A method for refining magnetic domains of a grain-oriented electrical steel sheet according to an exemplary embodiment of the present invention includes: a step of preparing a grain-oriented electrical steel sheet; and a step of forming a groove by irradiating a quasi-continuous laser beam of which a duty is from 98.0 to 99.9% on a surface of the grain-oriented electrical steel sheet.

The duty is a ratio $(T_b/T_a)$ of [a time of irradiation with an output of 10% or more of a maximum output (Pmax)] Tb to [an output modulation cycle time] Ta in a time diagram for an output of a laser beam.

A frequency of the quasi-continuous laser beam may be from 100 Hz to 8 kHz.

A ratio P/W of an average output P of a laser beam for a quasi-continuous laser beam width W may be from 30 W/μm to 300 W/μm.

A ratio W/L of a beam width W in a steel sheet rolling direction for a beam length L in a steel sheet width direction of the quasi-continuous laser beam may be from 0.1 to 0.86.

The laser may be a $TEM_{00}$ mode, and $M^2$ of a beam quality factor is 1.0 to 1.1.

Three to 8 grooves may be intermittently formed in the width direction of the steel sheet.

The grooves may be linear and formed at an angle of 82° to 98° with respect to a rolling direction of the electrical steel sheet.

A depth D of the groove may be from 3% to 8% of the thickness of the steel sheet.

After the step of forming the groove, a step of forming an oxide layer on the surface of the steel sheet through decarburization annealing or nitride annealing, and a step of coating an annealing separator on the surface of the steel sheet formed with the oxide layer and forming a non-metal oxide layer on the surface of the steel sheet through high temperature annealing, may be further included.

After the step of forming the non-metal oxide layer, a step of forming an insulating coating layer on the non-metal oxide layer may be further included.

According to an embodiment of the present invention, magnetic flux density degradation due to permanent magnetic domain refining may be reduced and the iron loss improvement rate may be increased.

Also, according to one embodiment of the present invention, the close contacting property of the steel sheet and the insulating coating layer after the final insulating coating is excellent.

MODE FOR INVENTION

The terms "first", "second", and "third" are used herein to explain various parts, components, regions, layers, and/or sections, but it should be understood that they are not limited thereto. These terms are used only to discriminate one portion, component, region, layer, or section from another portion, component, region, layer, or section. Thus, a first portion, component, region, layer, or section may be referred to as a second portion, component, region, layer, or section without departing from the scope of the present invention.

The technical terms used herein are to simply mention a particular embodiment and are not meant to limit the present invention. An expression used in the singular encompasses an expression of the plural, unless it has a clearly different meaning in the context. The term "including" used herein embodies concrete specific characteristics, regions, positive numbers, steps, operations, elements, and/or components, without limiting existence or addition of other specific characteristics, regions, positive numbers, steps, operations, elements, and/or components.

It will be understood that when an element such as a layer, film, region, or substrate is referred to as being "on" or "above" another element, it can be directly on or above the other element or intervening elements may also be present. In contrast, when an element is referred to as being "directly on" another element, there are no intervening elements therebetween.

If not defined differently, all the terminologies including technical terminologies and scientific terminologies used herein have meanings that are generally understood by those skilled in the art. The terms defined in dictionaries should be construed as having meanings corresponding to the related prior art documents and those stated herein, and are not to be construed as being idealized or official, if not so defined.

Hereinafter, exemplary embodiments of the present invention will be described in detail so as to be easily practiced by a person skilled in the art to which the present invention pertains. As those skilled in the art would realize, the described embodiments may be modified in various different ways, all without departing from the spirit or scope of the present invention.

A method for refining magnetic domains of a grain-oriented electrical steel sheet according to an exemplary embodiment of the present invention includes: a step of preparing a grain-oriented electrical steel sheet; and a step of forming a groove by irradiating a quasi-continuous laser beam of which a duty is 98.0 to 99.9% to a surface of the grain-oriented electrical steel sheet.

Figure 1:
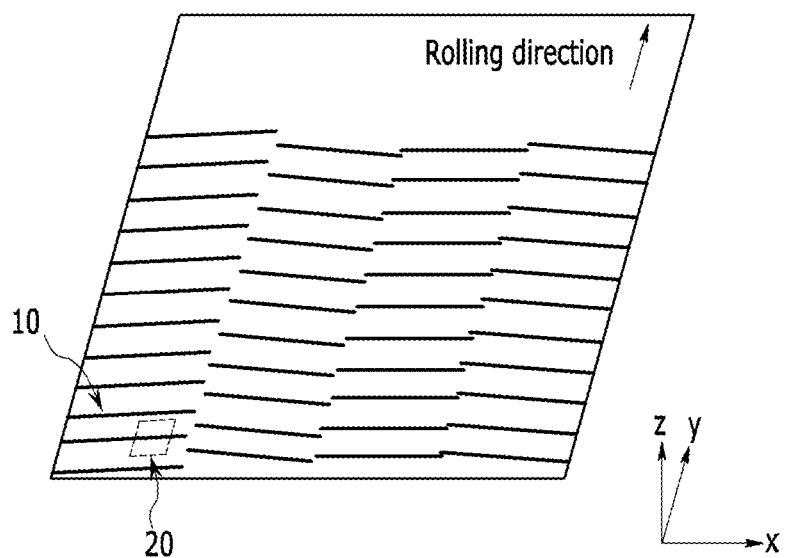
FIG. 1 is a schematic view of a surface of a grain-oriented electrical steel sheet according to an exemplary embodiment of the present invention.

FIG. 1 shows a schematic view of a grain-oriented electrical steel sheet 10 refined with magnetic domains according to an exemplary embodiment of the present invention. As shown in FIG. 1, a plurality of grooves 20 are formed on the surface of the grain-oriented electrical steel sheet 10 along a rolling direction. Hereinafter, each step will be described in detail.

First, the grain-oriented electrical steel sheet is prepared. In an exemplary embodiment of the present invention, by controlling an irradiation condition of a laser beam, to improve a magnetic characteristic, the grain-oriented electrical steel sheet that is an object of the refined magnetic domains may be used without limitation. Particularly, the effect of the present invention is realized without any relation to an alloy composition of the grain-oriented electrical steel sheet. Hereinafter, an alloy component of the grain-oriented electrical steel sheet will be described as an example.

The grain-oriented electrical steel sheet includes O: 0.0020 to 0.0080%, Si: 2.5 to 4.0%, C: 0.02 to 0.10%, Al: 0.02 to 0.04%, Mn: 0.05 to 0.20%, N: 0.002 to 0.012%, S: 0.001 to 0.010% and P: 0.01 to 0.08% based on the entire composition of 100 wt %, and a balance may include Fe and other unavoidable impurities. The other unavoidable impurities may be Ni, Cr, Sb, and a rare earth element, and a total weight of the impurities may be within 0.1 wt %.

The reason for limiting the alloy component is as follows. When Si is added at 2.5% or more, a specific resistance is increased such that the iron loss is improved, but when the content Si exceeds 4.0%, a mechanical characteristic may be deteriorated due to the increase in plate brittleness. C may be added at 0.02% or more to cause uniformity of texture during hot rolling and to suppress growth of a columnar texture during continuous casting, however when 0.10% is exceeded, as the decarburization annealing time is increased, the primary recrystallization grains are fine and the secondary recrystallization temperature becomes lower, therefore the magnetic characteristic may be deteriorated. As Al is added at 0.02% or more, it acts as a crystal grain growth inhibitor with a nitride form. However, when 0.04% is exceeded, the role of the inhibitor may be deteriorated due to precipitation of the coarse nitride. As Mn is added in an amount of 0.05% or more, a sulfide, which may act as the crystal grain growth inhibitor, is formed. However, when 0.20% is exceeded, the size of the primary recrystallization grain is reduced such that the secondary recrystallization is unstable and the Mn oxide is formed such that the iron loss may be deteriorated. N is added by 0.002% or more, and may act as the crystal grain growth inhibitor. However, when exceeding 0.012%, surface defects such as blisters may be caused. S is added at 0.001% or more such that the sulfide may be formed and act as the crystal grain growth inhibitor. However, when 0.010% is exceeded, a coarse sulfide may be formed and it may become difficult to act as the crystal grain growth inhibitor. When P is added at 0.01% or more, the growth of the {110}<001> texture may be promoted. However, if 0.08% is exceeded, embrittlement of the steel may increase. In the state that O is included at 0.0020 to 0.0080% in a slab, O is additionally penetrated into the steel sheet in the primary recrystallization annealing process, thereby increasing the oxygen content in the steel. Therefore, when the oxygen content in the steel is larger than the normal oxygen content, the oxide layer of the coated steel sheet is formed, and the oxide layer easily diffuses Mg in the subsequent secondary recrystallization annealing. Thus, it is possible to form non-metal oxide layers such as forsterite that penetrate into the coated steel sheet side.

In an exemplary embodiment of the present invention, the grain-oriented electrical steel sheet may be a grain-oriented electrical steel sheet that is rolled with a predetermined thickness through hot rolling and cold rolling from a slab.

Next, a quasi-continuous laser beam is irradiated to the surface of the prepared grain-oriented electrical steel sheet to form a groove. In an exemplary embodiment of the present invention, the quasi-continuous laser beam is irradiated instead of a pulse laser or a continuous wave laser as known in the art. Specifically, a quasi-continuous laser beam with a duty of 98.0 to 99.9% is irradiated. In an exemplary embodiment of the present invention, by irradiating the quasi-continuous laser beam, a solidified alloy layer at the bottom of the groove is uniformly formed and the magnetic property is improved by minimizing trapping of a fusion material by spatter re-solidification and adhesion with the insulating coating layer may be ensured.

Figure 2:
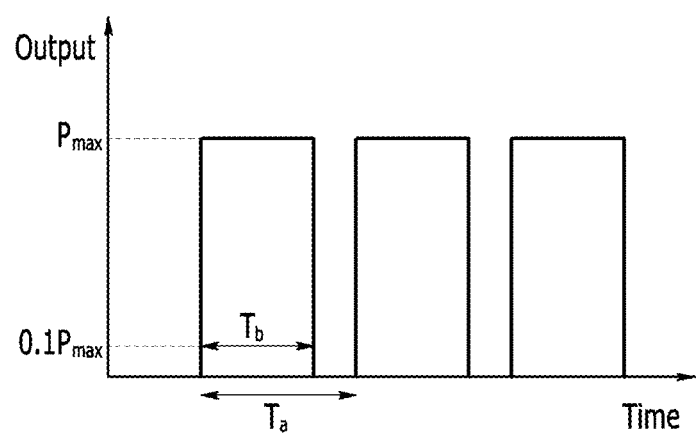
FIG. 2 is a time waveform for an output of a quasi-continuous laser beam.
Figure 3:
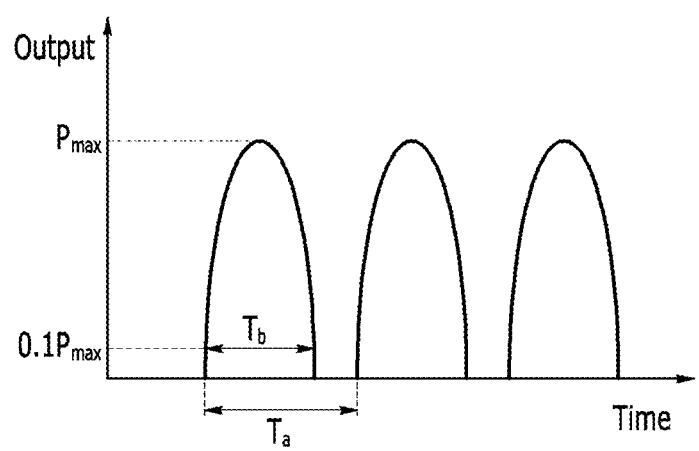
FIG. 3 is a time waveform for an output of a quasi-continuous laser beam.

FIG. 2 and FIG. 3 show a time waveform for an output of a quasi-continuous laser beam. The term "duty" means a ratio (Tb/Ta) of [a time of irradiation with an output of 10% or more of a maximum output (Pmax)] Tb to [an output modulation cycle time] Ta. As shown in FIG. 2, when the time waveform for the output of the laser beam is shown as On/Off, the duty may be the ratio (Tb/Ta) of [the laser irradiation time] Tb to [the output modulation cycle time] Ta. As shown in FIG. 3. when the time waveform of the output of the laser beam appears as a curved line shape instead of On/Off, the duty means the ratio (Tb/Ta) of [the time of the irradiation with the output of 10% or more of the maximum output (Pmax)] Tb to [the output modulation cycle time] Ta.

The duty of the quasi-continuous laser beam is 98.0 to 99.9%. If the duty is too small, the continuous linear grooves may not be formed, which may cause problems in the magnetic aspect. If the duty is too large, the quasi-continuous laser beam is similar to the continuous oscillation laser beam, and the solidified alloy layer formed at the bottom of the groove is too thin, thereby the adhesion characteristic with the insulating coating layer may be degraded.

A frequency of the quasi-continuous laser beam may be 100 Hz to 8 kHz. If the frequency deviates from the range described above, scattering of the fusion material during the laser irradiation may exhibit an abnormal behavior, thereby resulting in the spatter trapping in the bottom and sides of the groove. More specifically, the frequency of the quasi-continuous laser beam may range from 3 kHz to 6 kHz.

The ratio (P/W) of the average output P of the laser beam for the quasi-continuous laser beam width W may be between 30 W/μm and 300 W/μm. The uniform solid alloy layer may be formed at the bottom of the groove by controlling the ratio P/W of the average output P of the laser beam for the quasi-continuous laser beam width W with the range described above. If the ratio P/W of the average output P of the laser beam for the quasi-continuous laser beam width W is too small, the thickness of the solidified alloy layer formed under the groove becomes too thin. Thereby there is a problem that the thickness of the oxide layer formed in the following decarburization annealing becomes too thin. If the ratio P/W of the average output of the laser beam to the quasi-continuous laser beam width W is too large, since the thickness of the solidified alloy layer formed under the groove becomes too thick, the thermal effect is increased in the base portion. As a result, since the recrystallization is formed under the groove during the decarburization annealing, there is a problem that the secondary recrystallization is not formed. More specifically, the ratio P/W of the average output P of the laser beam to the quasi-continuous laser beam width W may be between 35 W/μm and 250 W/μm.

Figure 4:
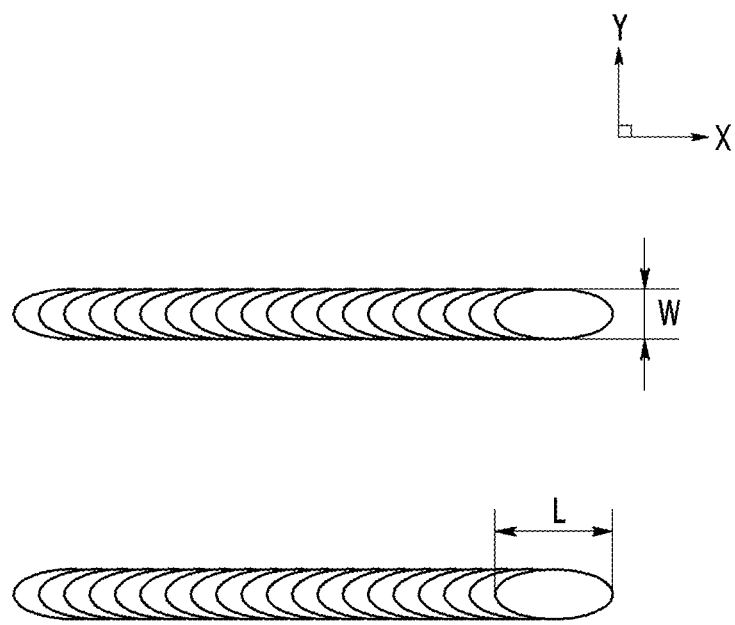
FIG. 4 is a schematic view showing a shape in a steel sheet surface.

FIG. 4 schematically shows the shape of the laser beam in the steel sheet surface. As shown in FIG. 4, in an exemplary embodiment of the present invention, the shape of the laser beam may be elliptical. When the shape of the laser beam is elliptical, it is advantageous in forming the groove to be continuously linear. Specifically, the ratio (W/L) of the beam width W in the steel sheet rolling direction to the beam length L in the steel sheet width direction of the quasi-continuous laser beam may be 0.1 to 0.86.

The laser may be a $TEM_{00}$ mode, and $M^2$ of a beam quality factor may be 1.0 to 1.1.

The output of the used laser may be from 0.5 to 5 kW.

Also, the groove 20 may be formed from 82° to 98° with respect to the rolling direction of the electrical steel sheet. By forming the groove 20 in an oblique line shape that does not include 90°, the magnetism may be improved by deteriorating a semi-magnetic field.

The grooves 20 may be formed intermittently from 3 to 8 in the width direction of the steel sheet.

The depth D of the groove may be formed at 3% to 8% of the thickness of the steel sheet. If the depth is too shallow, the effect of improving the iron loss may be minimal. If the depth is too deep, the heat affected part may increase and adversely affect the growth of the Goss texture.

After the step of forming the groove, a step of forming the oxide layer on the surface of the steel sheet through decarburization annealing or nitride annealing, and a step of forming a non-metal oxide layer on the surface of the steel sheet by coating an annealing separator on the surface of the steel sheet formed with the oxide layer and annealing with high temperature, may be further included.

In the step of forming the oxide layer (i.e., the primary recrystallization annealing), the nitride annealing may be performed after the decarburization annealing, or the decarburization annealing and the nitride annealing may be simultaneously performed. An annealing temperature during the primary recrystallization annealing may be from 700 to 950° C. In the primary recrystallization annealing, it is controlled to an oxidizing atmosphere for the decarburization. At this time, the Si contained in the steel sheet reacts with moisture existing in the decarburization annealing atmosphere gas to form an oxide layer on the surface layer part of the steel sheet. In the primary recrystallization annealing, the decarburization is achieved by the diffusion of the carbon inside the steel sheet to the surface, while the steel sheet reacts with the oxygen contained in the atmosphere gas, thereby an oxide layer such as $SiO_2$ or $Fe_2SiO_4$ (Faylite) is formed on the surface. In the primary recrystallization annealing process, the weight ratio of $SiO_2/Fe_2SiO_4$ in the oxide layer formed on the surface of the steel sheet may be 0.1 to 1.5. In this way, the weight ratio of the oxide layer formed in the primary recrystallization annealing process is closely related to the appropriate input amount of oxygen in the primary recrystallization annealing, that is, the decarburization annealing. The input amount of oxygen during decarburization annealing is controlled in the state that the oxygen content among the component of the steel sheet is included at more than the normal oxygen content. The input amount of oxygen during the decarburization annealing should take into account the oxidizing atmosphere (a dew point, a hydrogen atmosphere), the shape of the oxide layer in the surface layer part of the steel sheet, and the temperature of the steel sheet. If an oxidation capacity alone is determined, since the oxygen partial pressure is higher as the oxidation capacity is higher, it is better to increase the oxidation capacity. However, when the oxidation capacity becomes too high, a SiO2 or a Fe2SiO4 (Faylite) oxide is densely formed in the surface layer of the steel sheet. If such a dense oxide is formed, it acts as an obstacle to the penetration of oxygen in the depth direction, which resultantly prevents the penetration of oxygen into the steel sheet. Therefore, because the proper oxidation capacity for the decarburization exists, the decarburization occurs well and the appropriate oxide layer is formed at the dew point of 50 to 70° C. (50% N2 50% H2) atmosphere at the temperature range of 790 to 900° C. If the decarburization annealing is completed by controlling the decarburization atmosphere during the decarburization annealing, the oxygen amount of the oxygen layer in the steel sheet surface is in the range from 600 to 1000 ppm.

Next, the annealing separator is coated on the surface of the steel sheet formed with the oxide layer, and the high temperature annealing (i.e., the secondary recrystallization annealing) is performed to form the non-metal oxide layer on the surface of the steel sheet. The annealing separator is a slurry type, and MgO is used as a main component, and as a reaction promoter, one or a plurality of Ti compounds, Cl compounds, sulfides, borides, nitrides, or oxides is mixed and used. Since the annealing separator is a slurry type, it is preferable that it is coated on the steel sheet by a coating roll, and a coating amount is 2.0 to 12.5 g/m$^2$ on each side of the steel sheet. In the annealing separator, MgO as the main component of the annealing separator is reacted with SiO2 or/Fe2SiO4 of the oxide layer during the secondary recrystallization annealing, thereby forming a Forsterite (Mg2SiO4) glass coating film. This Forsterite coating film affects the behavior of the inhibitor in the secondary recrystallization annealing process, which affects the magnetic properties of the electrical steel sheet, and after forming the coating film, it also affects the coating film characteristic such as a close contact property with the coated steel sheet. It is preferable that an average powder particle diameter of MgO as the main component of the annealing separator is less than 2.5 μm, and it is more preferable that the average powder particle diameter of less than 2 μm is 10% or more.

The secondary recrystallization annealing may be performed by dividing a primary cracking process at 550 to 750° C. and a secondary cracking process at 1000 to 1250° C., and during a temperature rising section, the temperature may rise by 30 to 100° C. per hour in a temperature section of 650 to 950° C. and rise by 50° C. or less per hour in a temperature section of 950 to 1250° C. Also, in a cracking time, to remove moisture of the annealing separator, the primary cracking time may be 10 minutes or more and the secondary cracking time may be 8 hours or more. It is preferable that the secondary recrystallization annealing may be performed in a mixed atmosphere of nitrogen and hydrogen up to the secondary cracking temperature, and performed in a hydrogen atmosphere after reaching the secondary cracking temperature. When the secondary recrystallization annealing is performed by applying the annealing separator containing MgO as the main component, in the annealing process, Mg in the annealing separator is diffused into the base steel sheet and a Si oxide and Mg generated in the decarburization annealing process are mutually diffused to form forsterite. In the secondary recrystallization annealing process, crystal grains having a 110<001> Goss orientation are first grown from crystals having a Goss nucleus in the steel sheet to have an excellent electrical characteristic. The non-metal oxide layer may include $Al_2SiO_4$ or $Mn_2SiO_4$ as well as the exemplified $Mg_2SiO_4$.

After the step of forming the non-metal oxide layer, a step of forming an insulating coating layer on the non-metal oxide layer may be further included. As a detailed method, the insulating coating layer may be formed by a method of coating an insulating coating liquid including a phosphate. Such an insulating coating liquid preferably uses a coating liquid comprising a colloidal silica and a metal phosphate. In this case, the metal phosphate may be Al phosphate, Mg phosphate, or combination thereof, and the content of Al, Mg, or combinations thereof may be 15 wt % or more with respect to the weight of the insulating coating liquid.

After forming the insulating coating layer, stress relaxation annealing may be further performed.

Hereinafter, the present invention is described in more detail through an example. However, this example is merely to illustrate the present invention, and the present invention is not limited thereto.

Example

A grain-oriented electrical steel sheet of a thickness 0.27 mm, which is cold-rolled, is prepared. A laser of a TEM$_{00}$ mode and having a beam quality factor M$^2$ of 1.0 is irradiated to the electrical steel sheet surface by controlling the output with 2.8 kW.

In this case, the laser is irradiated while changing the shape of the laser beam, the duty, the frequency, and the P/W value as in Table 1 and Table 2 as follows. Next, the decarburization annealing and the nitride treatment are performed, and then the annealing separator including MgO as the main component is coated to be 8 g/m$^2$ per side of the steel sheet, and then the secondary recrystallization annealing is applied to the steel sheet. Next, the insulating coating layer is formed by coating the insulating coating liquid including the colloidal silica and the metal phosphate.

TABLE 1

|  | Duty % | Frequency Hz | P/W W/mm | Groove depth nm | Before laser irradiation $W_{17/50}/B_8$ | After laser irradiation | Improvement rate % | Close contacting property Φ |
|---|---|---|---|---|---|---|---|---|
| Example (quasi-continuous oscillation/oval) | 98.0 | 5000 | 33 | 8.1 | 0.90/1.91 | 0.83/1.90 | 7.8 | 10 |
| | | | | | 0.89/1.91 | 0.83/1.90 | 6.7 | 10 |
| | | | | 21.6 | 0.89/1.91 | 0.79/1.89 | 11.2 | 15 |
| | | | | | 0.88/1.91 | 0.79/1.89 | 10.2 | 15 |
| | 99.9 | | 33 | 15.2 | 0.88/1.91 | 0.82/1.90 | 6.8 | 15 |
| | | | | | 0.89/1.91 | 0.81/1.89 | 9.0 | 15 |
| | 99.9 | | 250 | 15.1 | 0.88/1.91 | 0.83/1.90 | 5.7 | 15 |
| | | | | | 0.89/1.91 | 0.83/1.90 | 6.7 | 15 |

TABLE 2

| | Duty % | Frequency Hz | P/W W/mm | Groove depth nm | Before laser irradiation $W_{17/50}/B_8$ | After laser irradiation | Improvement rate % | Close contacting property Φ |
|---|---|---|---|---|---|---|---|---|
| Example (quasi-continuous/oval) | 99.9 | 5000 | 50 | 16.1 | 0.88/1.91<br>0.89/1.91 | 0.82/1.90<br>0.82/1.90 | 6.8<br>7.9 | 10<br>10 |
| Comparative example (quasi-continuous/oval) | 99.9<br>99.9 | 5000<br>5000 | 10<br>350 | 5.0<br>8.0 | 0.88/1.91<br>0.89/1.91 | 1.02/1.84<br>1.12/1.86 | −15.9<br>−25.8 | 35<br>30 |
| Comparative example (quasi-continuous/oval) | 95.0 | 5000 | 50 | 16.1 (part formation) | 0.88/1.91 | 0.87/1.91 | 1.1 | 20 |
| Comparative example (continuous/oval) | 100 | — | 50 | 16.1 | 0.88/1.91<br>0.89/1.91 | 0.83/1.88<br>0.82/1.89 | 5.7<br>7.9 | 25<br>20 |
| Comparative example (Pulse laser/Discontinuous groove) | — | 5000 | 50 | 16.2 | 0.88/1.91<br>0.89/1.91 | 0.95/1.84<br>0.94/1.85 | −8.0<br>−5.6 | 30<br>30 |

In Table 1 and Table 2, the iron loss improvement rate is calculated as $(W_1-W_2)/W_1$ by measuring an iron loss $W_1$ of the electrical steel sheet before irradiating the laser to form the groove and an iron loss $W_2$ after irradiating the laser to form the groove. The close contacting property represents whether peeling or desorption of the insulating coating and the non-metal oxide layer occurs as a bar diameter when closely contacting and bending the steel sheet to a circular bar (with a diameter 5 to 80 mm).

As shown in Table 1 and Table 2, when using the quasi-continuous laser, it may be confirmed that the iron loss improvement rate and the close contacting property are simultaneously improved. On the other hand, it may be confirmed that the duty is low even if the quasi-continuous laser is used, or it is poor in the close contacting property when the continuous laser is used. Also, when using the pulse laser, it may be confirmed that the iron loss improvement rate and the close contacting property are simultaneously poor. Even when using the quasi-continuous laser, in a case of appropriately controlling the P/W value, it may be confirmed that the iron loss improvement rate and the close contacting property are further improved. When the duty is a low as 95%, since the grooved and non-grooved parts appear on the scanned line in a plate length direction, the grooves appear at the portion where the lines are formed, but the grooves are not formed at the portion where no lines are formed. Therefore, a result that the iron loss value is statistically improved by about 1.3% appears.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

<Description of symbols>

10: electrical steel sheet    20: groove

The invention claimed is:

1. A method for refining magnetic domains of a grain-oriented electrical steel sheet, comprising:
   a step of preparing a grain-oriented electrical steel sheet; and
   a step of forming a groove by irradiating a quasi-continuous laser beam of which a duty is from 98.0 to 99.9% on a surface of the grain-oriented electrical steel sheet,
   wherein the duty is a ratio $(T_b/T_a)$ of [a time of irradiation with an output of 10% or more of a maximum output (Pmax)] Tb to [an output modulation cycle time] Ta in a time diagram for an output of a laser beam,
   wherein the laser has a $TEM_{00}$ mode, and $M^2$ of a beam quality factor is 1.0 to 1.1, and
   wherein a ratio P/W of an average output P of a laser beam for a quasi-continuous laser beam width W is from 30 W/μm to 300 W/μm.

2. The method for refining magnetic domains of the grain-oriented electrical steel sheet of claim 1, wherein a frequency of the quasi-continuous laser beam is from 100 Hz to 8 kHz.

3. The method for refining magnetic domains of the grain-oriented electrical steel sheet of claim 1, wherein a ratio W/L of a beam width W in a steel sheet rolling direction to a beam length L in a steel sheet width direction of the quasi-continuous laser beam is from 0.1 to 0.86.

4. The method for refining magnetic domains of the grain-oriented electrical steel sheet of claim 1, wherein 3 to 8 grooves are intermittently formed in the width direction of the steel sheet.

5. The method for refining magnetic domains of the grain-oriented electrical steel sheet of claim 1, wherein the grooves are linear and are formed at an angle from 82° to 98° with respect to a rolling direction of the electrical steel sheet.

6. The method for refining magnetic domains of the grain-oriented electrical steel sheet of claim 1, wherein a depth D of the groove is formed from 3% to 8% of the thickness of the steel sheet.

7. The method for refining magnetic domains of the grain-oriented electrical steel sheet of claim 1, further comprising,
after the step of forming the groove:
a step of forming an oxide layer on the surface of the steel sheet through decarburization annealing or nitride annealing; and
a step of coating an annealing separator on the surface of the steel sheet formed with the oxide layer and forming non-metal oxide layer on the surface of the steel sheet through high temperature annealing.

8. The method for refining magnetic domains of the grain-oriented electrical steel sheet of claim 7, further comprising,
after the step of forming the non-metal oxide layer,
a step of forming an insulating coating layer on the non-metal oxide layer.

* * * * *